Jan. 30, 1973  J. J. MORAN  3,713,785

FUME EXHAUST AND TREATING SYSTEM

Filed Jan. 20, 1971

John J. Moran
INVENTOR.

BY
ATTORNEYS

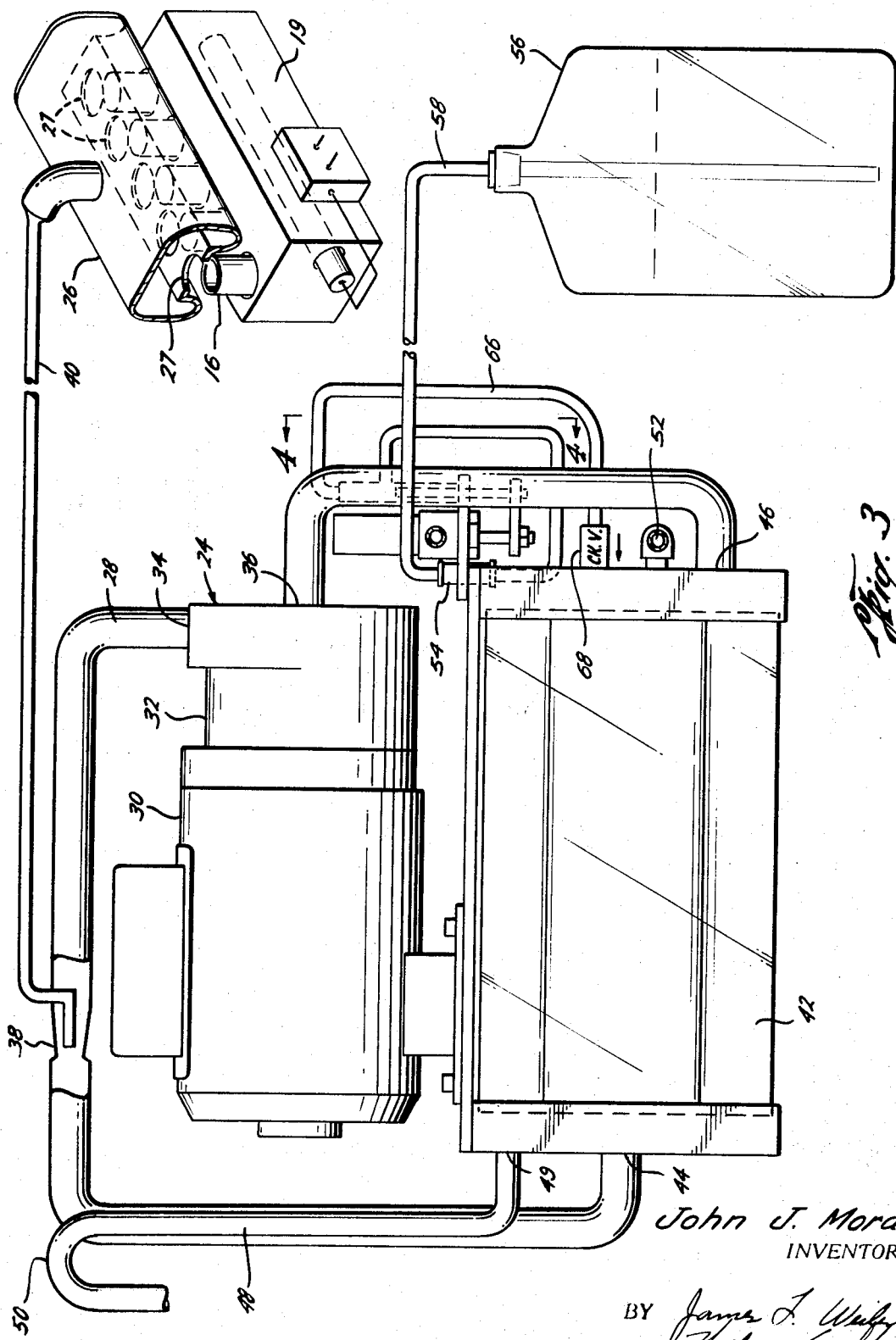

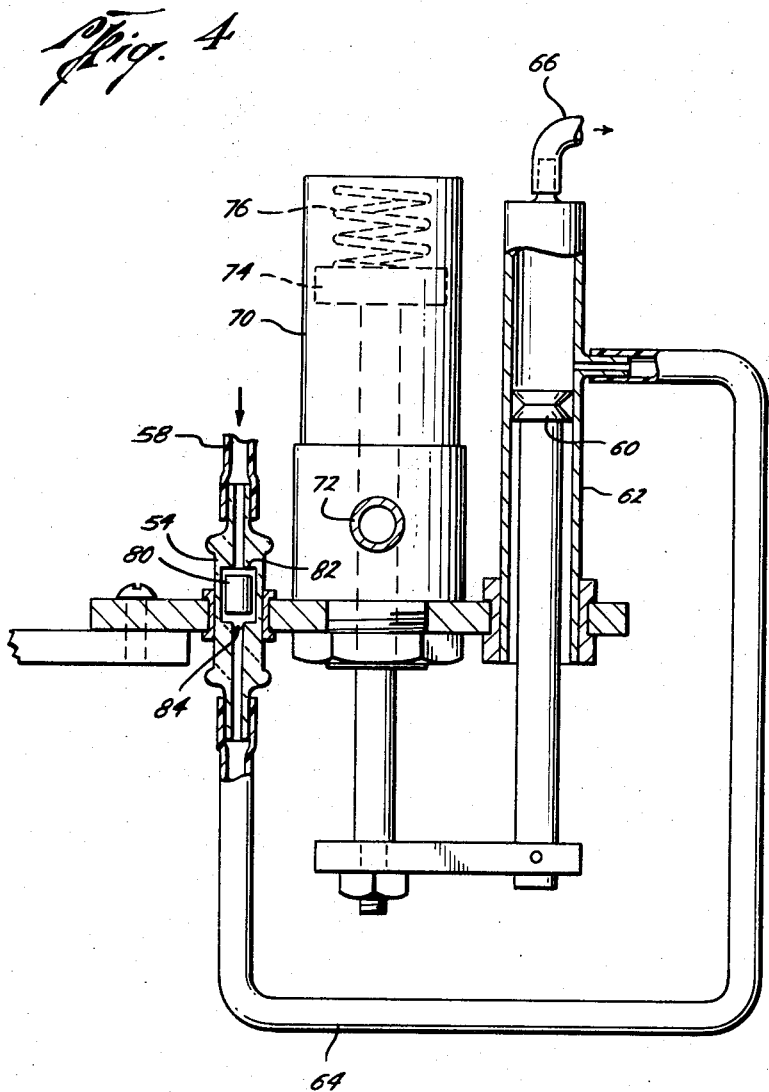

United States Patent Office 3,713,785
Patented Jan. 30, 1973

---

3,713,785
FUME EXHAUST AND TREATING SYSTEM
John J. Moran, Houston, Tex., assignor to
Hycel, Inc., Houston, Tex.
Filed Jan. 20, 1971, Ser. No. 108,022
Int. Cl. F23j *11/00, 11/08;* B01l *1/00*
U.S. Cl. 23—292                                                6 Claims

ABSTRACT OF THE DISCLOSURE

A fume exhaust and treating system having a hood for receiving fumes to be treated and including a circulating water system with a venturi therein and connected to the hood for creating a vacuum for drawing fumes from the hood and a container in the circulating water system with means for injecting water and a treating agent into the container for treating the fumes and an overflow drain connected to the water system. A fume treating system in combination with a chemical testing apparatus which automatically performs chemical tests for removing the noxious fumes from the apparatus.

BACKGROUND OF THE INVENTION

Fume exhaust systems for treating noxious fumes from chemical tests are old. However, such systems are bulky, cumbersome and inefficient.

The present invention is generally directed to provide an improved fume exhaust and treating system which uses a water circulating system which provides the power to draw the fumes from a hood and also provides a system for at least partially neutralizing the noxious fumes. In addition, the present invention is directed to providing a fume exhaust treating system which may be used with an automatic chemical testing apparatus and requires only the facilities readily available thereon such as water, power and drain.

SUMMARY

The present invention is directed to an improved fume exhaust and treating system and in particular is directed to such a system which may be utilized with an automatic chemical testing apparatus for removing and treating the fumes generated at the heating station.

Another feature of the present invention is the provision of a fume exhaust and treating system having a hood for receiving the fumes to be treated with a water circulating system creating a vacuum to draw fumes from the hood into the circulating system, and a mixing container in the circulating water system with means for periodically injecting a treating agent and additional water into the container for neutralizing the fumes with an overflow drain connected to the water system for removing the treated materials.

Still a further feature of the present invention is wherein the drain includes a portion higher in elevation than the circulating water system thereby insuring that the water system remains full at all times.

Another feature of the present invention is the improved means for injecting a treating agent into a container including a first check valve connected to the treating agent supply with a second check valve connected to the container and a piston cylinder assembly for drawing the treating agent through the first valve and out the second valve.

Yet a further object of the present invention is the provision of the improved fume exhaust and treating system with the present invention in combination with the chemical testing apparatus in which a plurality of reaction tubes pass through various positions and in which the fume exhaust and treating system hood of the present invention is positioned over the heating station to receive the fumes and the treating system is operable on the power, water and drainage system of the testing apparatus.

Other and further objects, features and advantages will be apparent from the following description of the presently preferred embodiment of the invention given for the purpose of disclosure and taken in conjunction with the accompanying drawings.

BRIEF DESCRIPTION OF THE DRAWINGS

FIG. 3 is an enlarged schematic view, partly in perspective and partly in cross section of the fume exhaust and treating system of the present invention, and FIG. 4 is a cross-sectional view taken along the line 4—4 of FIG. 3.

DESCRIPTION OF THE PREFERRED EMBODIMENT

The present invention will be described, by way of example only, as used in combination with my copending patent application Ser. No. 737,065, filed June 14, 1968, entitled "Automatic Chemical Testing Apparatus" now U.S. Pat. No. 3,622,279. However, it will be recognized that the present invention can be used on other types of automatic chemical testing apparatuses and may also be used solely by itself for treating noxious fumes at various locations.

Figure 1:
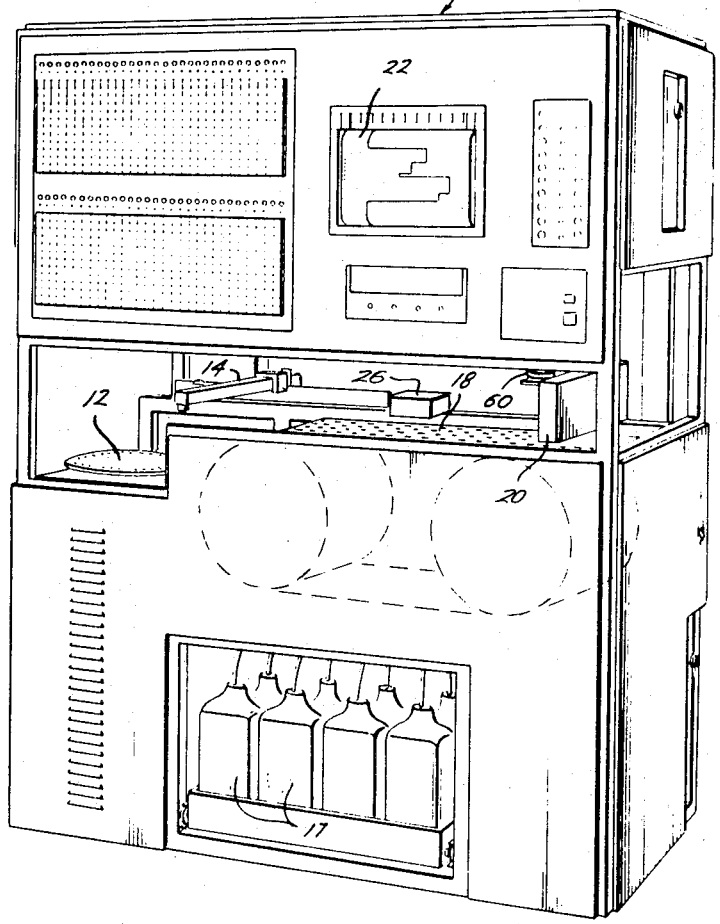
FIG. 1 is a perspective and schematic view of the present invention as used on one type of automatic chemical testing apparatus.
Figure 2:
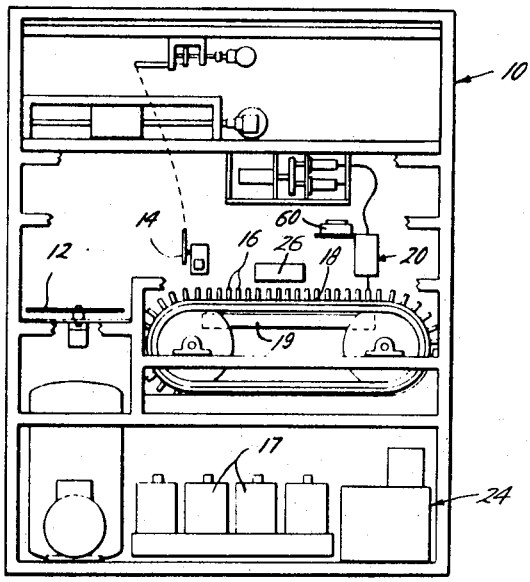
FIG. 2 is a schematic elevational view of the apparatus of FIG. 1.

Referring now to FIGS. 1 and 2, the reference numeral 10 generally indicates an automatic chemical testing apparatus having a sample table 12 on which the samples to be tested are placed. The samples on the table 12 are rotated sequentially to a pick up station wherein a pick up and dispensing mechanism 14 picks up the sample and places it into containers 16 on an endless belt 18 for sequentially carrying the samples through the desired testing procedures such as adding reagents from the containers 17 thereto, heating by heating means 19, and a testing station 20 which reads out the test results and records the results on a recorder 22.

However, at the heating station the heating means 19 heats the reaction tubes 16 and the contents thereof which create fumes which may be noxious and corrosive, and which must be suitably removed, treated and disposed of.

Thus, referring to FIGS. 1–3, the present invention is directed to a fume exhaust and treating system generally indicated by the reference numeral 24 which includes a fume hood 26 positioned over the heater 19 and over the tubes 16 which are sequentially positioned therein for receiving, collecting, and removing the fumes which are driven out of the tubes 16 during the heating process of the automatic chemical testing apparatus 10. Preferably the hood 26 is closed except for providing a plurality of openings 27 in the bottom positioned to be aligned with the tops of the tubes 16 when they are in the heater 19 whereby suction in the hood 26 will be drawing on the tops of the tubes 16. In addition, the fume treating system 24 includes a circulating water system 28 in which the water therein is continuously circulated by a motor 30 driving a pump 32 in which the pump has an outlet 34 and an inlet 36.

A venturi 38 is connected in the water circulating system 28 to create a vacuum in line 40 which is connected to the hood 26 to draw fumes through openings 27 from the hood 26 into the water circulating system 28 for treatment and disposal.

A container 42 is provided in the water circulation system to act as a mixing chamber and has an inlet 44 and an outlet 46 for mixing and circulating water and a treating agent through the circulation system 28. In addition, a drain 48 is provided connected to the container 42. The top 50 of the drain 48 is high enough in elevation with respect to the circulating water system 28 to insure that the water system 28 remains full at all times but the drain 48 will transmit the excess liquid in the container 42 to a suitable drain such as the drain (not shown) of the automatic chemical testing apparatus 10.

Suitable means such as a water inlet 52 may be provided to continually insert or inject water into the container 42 for mixing in the chamber 42 and creates a continuous overflow through the drain 48. Additionally, means for periodically injecting a treating agent into the container 42 are provided. Referring now to FIGS. 3 and 4, a first check valve 54 is provided connected to a treating agent supply 56 for receiving a treating agent therefrom through line 58. The treating agent in the supply container 56 is drawn through the check valve 54 when an injection piston 60 is moved downwardly in an injection cylinder 62 creating a suction in line 64 to draw the treating agent into the cylinder 62. Upon the upstroke of the piston 60 the treating agent is forced out through line 66 through a second check valve 68 which is identical to check valve 54 and injected into the container 42. The injecting piston 60 may be actuated by any suitable means such as an air piston and cylinder assembly 70 having an air inlet 72 to actuate the power piston 74 on the power stroke with a spring 76 return. Any suitable timing means may be provided to actuate and time the desired amount of injection of the treating agent into the container 42. For example only, and assuming that the fumes in the hood were coming from a protein bound iodine test, the treating agent may be sodium hydroxide and 2 cc. may be injected every 90 seconds into the container 42 to neutralize the fumes in the water mixture whereby they may be safely expelled out the drain 48.

It is noted that the treating agent entrance into the mixing container 42 at check valve 68 and the water inlet 52 both are spaced from the drain exit 49 to insure that the treated materials instead of the incoming water and treating agent is expelled from the container 42.

Of course, since the fumes entering the hood 26 may be quite corrosive the fume exhaust and treating system 24 should be of a chemically inert material that will withstand the chemical action of the fumes entering the system. Thus, the lines in the circulating water system 28 may be of PVC or other suitable material, and the container 42 may be of an acrylic or Plexiglas material. The check valves 54 and 68 may include a glass tubular element 80 which seats against a ground glass valve 82 in the direction in which the valve checks, but which includes a notch 84 on the second side to provide a flow around the valve 80 in the second direction.

The fume exhaust and treating system 24 of the present invention is well suited for use with an automatic chemical testing apparatus 10 in that the treating system 24 may operate on the facilities available at the apparatus 10 since the treating system 24 merely requires electric power for the motor 30, fresh water to be inserted in the container 42, a drain to receive the drain 48 and a storage area for storing the treating agent in the supply container 56, all of which are available on the apparatus 10.

In use, after the samples to be tested have been dispersed into the reaction tubes 16 in the automatic chemical testing apparatus 10, and receive agents, they are passed to the heating station wherein the heater 19 heats the tubes 16 and their contents driving off fumes therefrom. The hood 26 is positioned over the heating station 19 and tubes 16 for receiving the fumes. Water is circulated through the circulating water system 28 continuously wthereby the venturi 38 creates a vacuum in the line 40 to draw the fumes from the hood 26 into the water circulating system 28. The water circulating system 28 and the container 42 normally contain and are filled with water and a treating agent and thus the fumes entering the circulating system 28 are mixed and neutralized. And of course the container 42 acts as a mixing chamber as the incoming fumes are passed to the water circulating system 28 and into container inlet 44 and mixed therein with the additional water and treating agent as the mixture is recirculated to the outlet 46 and continuously around the system. The power piston and cylinder assembly 70 periodically actuates the injection piston 60 to draw in the treating agent from the container 56 through the check valve 54. The piston 60 moves upwardly in the cylinder 62 and injects a quantity thereof through the check valve 68 and into the container 42 for mixing in the circulating system 28. Also, water is continuously injected into the container 42 through the water inlet 52 thereby insuring continuous agitation and mixing of the fluids in the container 42. And of course the continuous injection of a treating agent and water into the container 42 creates an excess of liquid therein with the overflow being forced out of the drain 48 with the treated fumes as new water and treating agent are continuously supplied for neutralizing the fumes.

The present invention is therefore well adapted to carry out the objects and attain the ends and advantages mentioned as well as others inherent therein.

What is claimed is:

1. A fume exhaust and treating system comprising,
   a hood for receiving fumes to be treated,
   a circulating water system,
   a venturi connection in the circulating system and a connection between the venturi and the hood for creating a vacuum in the hood by the circulating water to draw fumes from the hood into the circulating system,
   a container in the circulating water system,
   means for introducing a treating agent into the circulating water system,
   means for introducing water into the circulating water system, and
   an overflow drain connected to the water system.

2. The apparatus of claim 1 wherein the drain includes a portion higher in elevation than the circulating water system thereby insuring that the water system remains full at all times.

3. The apparatus of claim 1 wherein the means for injecting a treating agent includes,
   a first check valve connected to a treating agent supply,
   a second check valve connected to the container, and
   a piston and cylinder assembly for drawing the treating agent through the first valve and out the second valve.

4. In a chemical testing apparatus in which a plurality of reaction tubes are indexed through various positions, test samples and reagents are dispensed into the reaction tubes, the reaction tubes are heated at a heating position, and the contents of the tubes are analyzed, the improvement in a fume exhaust and treating system comprising,
   a hood positioned over the heating position of the tubes for receiving fumes from the heated tubes,
   a continuously circulating water system,
   a venturi connection in the circulating system and a connection between the venturi and the hood for creating a vacuum in the hood by the circulating water to draw fumes from the hood into the circulating system,
   a container in the circulating water system, means for introducing a treating agent into the circulating water system for neutralizing the fumes,
means for introducing water into the circulating water system, and
an overflow drain connected to the water system.

5. The apparatus of claim 4 wherein the drain includes a portion higher in elevation than the circulating water system thereby insuring that the water system remains full at all times.

6. The apparatus of claim 5 wherein the means for injecting a treating agent includes,
a first check valve connected to a treating agent supply,
a second check valve connected to the container, and
a piston and cylinder assembly for drawing the treating agent in thorugh the first valve and out the second valve.

References Cited

UNITED STATES PATENTS

| 2,810,337 | 10/1957 | Samuelson et al. | 98—115 L H |
|---|---|---|---|
| 3,098,800 | 7/1963 | Moran et al. | 23—292 X |
| 3,318,227 | 5/1967 | Nelson et al. | 98—115 L H |
| 3,121,618 | 2/1964 | Yerzley | 23—292 |
| 3,425,335 | 2/1969 | Black | 98—115 L H |

MORRIS O. WOLK, Primary Examiner

R. E. SERWIN, Assistant Examiner

U.S. Cl. X.R.

23—253 R, 259; 98—115 L H